US012695481B2

(12) United States Patent
Vermani et al.

(10) Patent No.: US 12,695,481 B2
(45) Date of Patent: **\*Jul. 28, 2026**

(54) DISTRIBUTED MULTI-USER (MU) WIRELESS COMMUNICATION

(71) Applicant: QUALCOMM Incorporated, San Diego, CA (US)

(72) Inventors: Sameer Vermani, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/448,010

(22) Filed: Aug. 10, 2023

(65) Prior Publication Data

US 2024/0022286 A1 Jan. 18, 2024

Related U.S. Application Data

(63) Continuation of application No. 17/127,890, filed on Dec. 18, 2020, now Pat. No. 11,728,848, which is a
(Continued)

(51) Int. Cl.
*H04B 7/024* (2017.01)
*H04B 7/0417* (2017.01)
(Continued)

(52) U.S. Cl.
CPC ........... *H04B 7/024* (2013.01); *H04B 7/0417* (2013.01); *H04B 7/0452* (2013.01);
(Continued)

(58) Field of Classification Search
CPC .... H04B 7/024; H04B 7/0417; H04B 7/0452; H04B 7/0626; H04B 7/0643;
(Continued)

(56) References Cited

U.S. PATENT DOCUMENTS

| 10,897,285 B2 | 1/2021 | Vermani et al. |
| 11,728,848 B2 | 8/2023 | Vermani et al. |
| | (Continued) | |

FOREIGN PATENT DOCUMENTS

| CN | 104871438 A | 8/2015 |
| EP | 2741431 A2 | 6/2014 |
| | (Continued) | |

OTHER PUBLICATIONS

Gokturk M.S., et al., "Cooperation with Multiple Relays in Wireless Sensor Networks: Optimal Cooperator Selection and Power Assignment," 2014, Wireless Networks, 20, 209-225, 17 pages.
(Continued)

*Primary Examiner* — Noel R Beharry
*Assistant Examiner* — Rodrick Mak
(74) *Attorney, Agent, or Firm* — Patterson + Sheridan, L.L.P.

(57) ABSTRACT

This disclosure provides systems, methods and apparatus, including computer programs encoded on computer storage media, for group formation and sounding for distributed multi-user multiple input multiple output (MU-MIMO). Some implementations include a method of wireless communication. The method includes transmitting, from a first access point of a plurality of access points, an announcement frame for performing a beamforming procedure for a distributed transmission. The distributed transmission includes a transmission from the plurality of access points. The announcement frame includes at least one identifier of a user terminal in a different basic service set than a basic service set of the first access point. The method further includes transmitting a packet for measuring a channel. The method further includes receiving feedback information from the user terminal based on the packet for measuring the channel.
(Continued)

The method further includes transmitting the distributed transmission using the beamforming procedure.

20 Claims, 9 Drawing Sheets

Related U.S. Application Data continuation of application No. 15/872,294, filed on Jan. 16, 2018, now Pat. No. 10,897,285.

(60) Provisional application No. 62/459,290, filed on Feb. 15, 2017.

(51) Int. Cl.

| | |
|---|---|
| *H04B 7/0452* | (2017.01) |
| *H04B 7/06* | (2006.01) |
| *H04L 5/00* | (2006.01) |
| *H04W 16/28* | (2009.01) |
| *H04W 72/044* | (2023.01) |
| *H04W 72/27* | (2023.01) |
| *H04W 72/29* | (2023.01) |
| *H04W 84/12* | (2009.01) |

(52) U.S. Cl.

CPC .......... *H04L 5/0035* (2013.01); *H04L 5/0044* (2013.01); *H04L 5/0091* (2013.01); *H04W 72/046* (2013.01); *H04W 72/29* (2023.01); *H04W 84/12* (2013.01); *H04B 7/0617* (2013.01); *H04B 7/0626* (2013.01); *H04B 7/0643* (2013.01); *H04L 5/0007* (2013.01); *H04L 5/0023* (2013.01); *H04L 5/0051* (2013.01); *H04W 16/28* (2013.01); *H04W 72/27* (2023.01)

(58) Field of Classification Search

CPC ... H04B 7/0617; H04L 5/0044; H04L 5/0091; H04L 5/0035; H04L 5/0051; H04L 5/0023; H04L 5/0007; H04W 72/046; H04W 72/29; H04W 72/27; H04W 16/28; H04W 84/12

See application file for complete search history.

(56) References Cited

U.S. PATENT DOCUMENTS

| | | | |
|---|---|---|---|
| 2007/0230373 A1 | 10/2007 | Li et al. | |
| 2008/0225687 A1* | 9/2008 | Oksman ............... | H04L 41/0893 |
| | | | 370/201 |
| 2010/0046453 A1 | 2/2010 | Jones, IV et al. | |
| 2011/0075607 A1 | 3/2011 | Kim et al. | |
| 2012/0058735 A1 | 3/2012 | Vermani et al. | |
| 2013/0324136 A1 | 12/2013 | Hirata et al. | |
| 2013/0329626 A1 | 12/2013 | Sohn, III et al. | |
| 2014/0241240 A1 | 8/2014 | Kloper et al. | |
| 2014/0348100 A1* | 11/2014 | Ratasuk ................ | H04L 5/0035 |
| | | | 370/329 |
| 2015/0295629 A1 | 10/2015 | Xia et al. | |
| 2016/0029226 A1 | 1/2016 | Aboul-Magd et al. | |
| 2016/0029227 A1* | 1/2016 | Aboul-Magd ......... | H04B 7/024 |
| | | | 370/329 |
| 2016/0072569 A1 | 3/2016 | Yang et al. | |
| 2016/0254884 A1 | 9/2016 | Hedayat et al. | |
| 2016/0337007 A1 | 11/2016 | Seyedmehdi et al. | |
| 2016/0380729 A1 | 12/2016 | Porat et al. | |
| 2017/0033898 A1 | 2/2017 | Chun et al. | |
| 2017/0257859 A1 | 9/2017 | Li et al. | |
| 2017/0279587 A1 | 9/2017 | Ghosh et al. | |
| 2018/0138959 A1 | 5/2018 | Chun et al. | |
| 2018/0234135 A1 | 8/2018 | Vermani et al. | |
| 2019/0045366 A1 | 2/2019 | Vermani et al. | |
| 2020/0059808 A1 | 2/2020 | Lim et al. | |
| 2021/0152396 A1* | 5/2021 | Cherian ............... | H04B 7/0452 |
| 2021/0226671 A1 | 7/2021 | Vermani et al. | |

FOREIGN PATENT DOCUMENTS

| | | |
|---|---|---|
| WO | 2011036621 A1 | 3/2011 |
| WO | 2014066785 A1 | 5/2014 |
| WO | 2015101017 A1 | 7/2015 |
| WO | 2016112287 A1 | 7/2016 |

OTHER PUBLICATIONS

International Preliminary Report on Patentability—PCT/US2018/013943, The International Bureau of WIPO—Geneva, Switzerland, Aug. 29, 2019.

International Search Report and Written Opinion—PCT/US2018/013943—ISA/EPO—Apr. 24, 2018.

\* cited by examiner

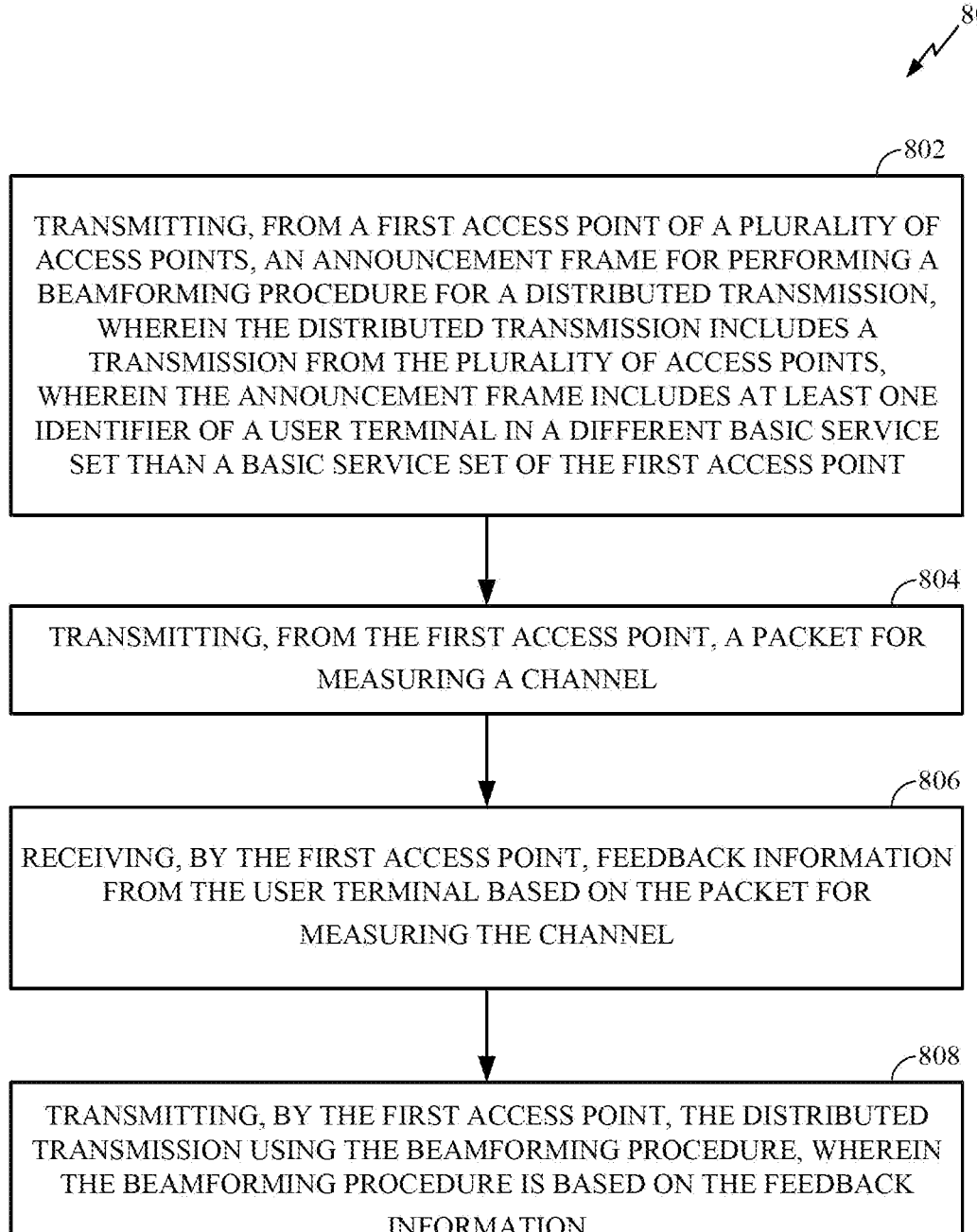

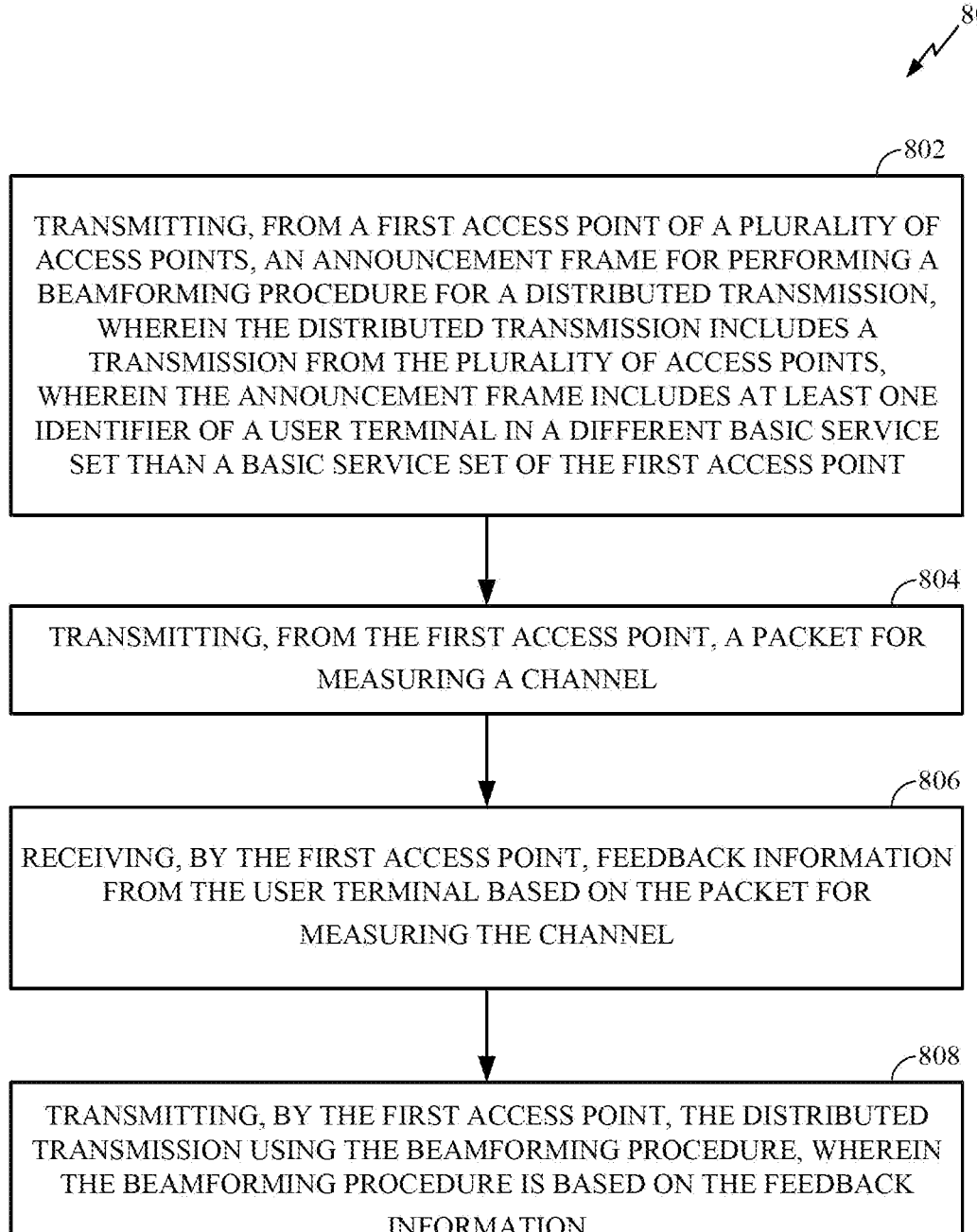

800

802

TRANSMITTING, FROM A FIRST ACCESS POINT OF A PLURALITY OF ACCESS POINTS, AN ANNOUNCEMENT FRAME FOR PERFORMING A BEAMFORMING PROCEDURE FOR A DISTRIBUTED TRANSMISSION, WHEREIN THE DISTRIBUTED TRANSMISSION INCLUDES A TRANSMISSION FROM THE PLURALITY OF ACCESS POINTS, WHEREIN THE ANNOUNCEMENT FRAME INCLUDES AT LEAST ONE IDENTIFIER OF A USER TERMINAL IN A DIFFERENT BASIC SERVICE SET THAN A BASIC SERVICE SET OF THE FIRST ACCESS POINT

804

TRANSMITTING, FROM THE FIRST ACCESS POINT, A PACKET FOR MEASURING A CHANNEL

806

RECEIVING, BY THE FIRST ACCESS POINT, FEEDBACK INFORMATION FROM THE USER TERMINAL BASED ON THE PACKET FOR MEASURING THE CHANNEL

808

TRANSMITTING, BY THE FIRST ACCESS POINT, THE DISTRIBUTED TRANSMISSION USING THE BEAMFORMING PROCEDURE, WHEREIN THE BEAMFORMING PROCEDURE IS BASED ON THE FEEDBACK INFORMATION

FIG. 8

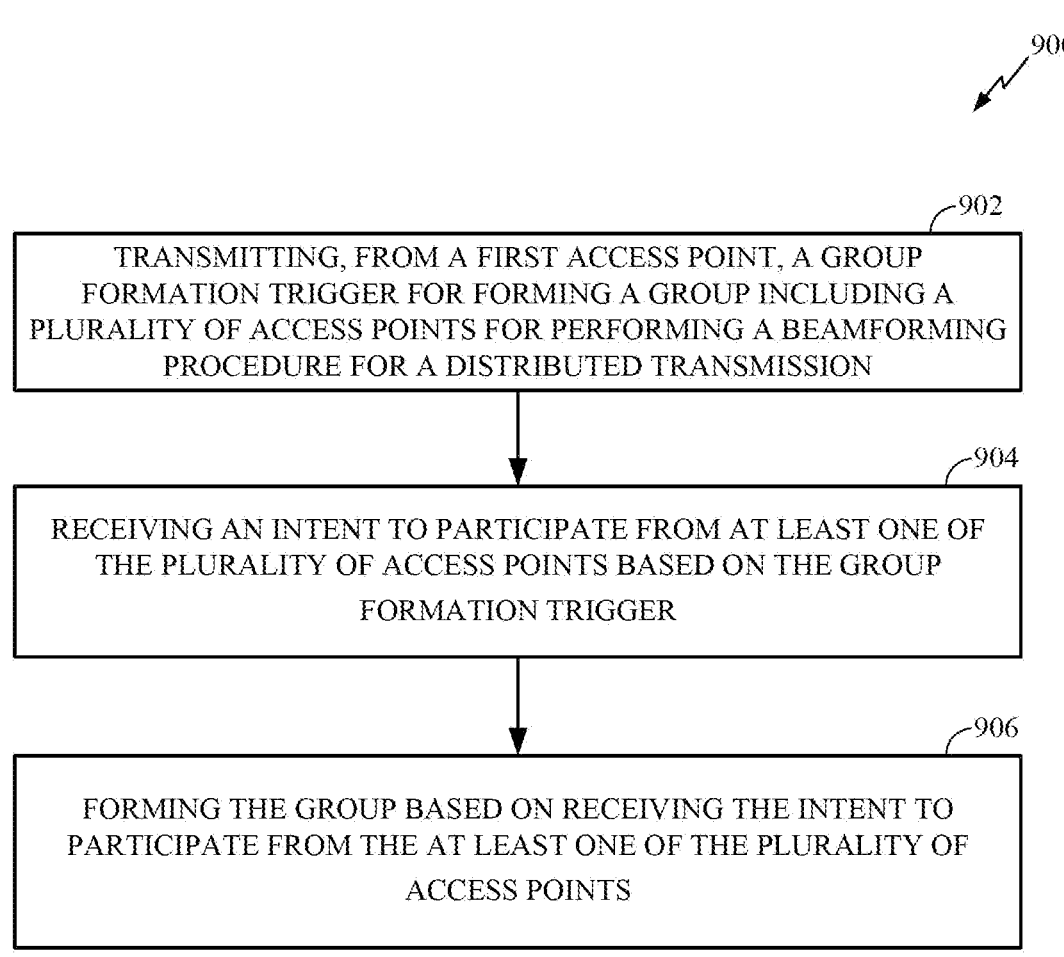

900

902

TRANSMITTING, FROM A FIRST ACCESS POINT, A GROUP
FORMATION TRIGGER FOR FORMING A GROUP INCLUDING A
PLURALITY OF ACCESS POINTS FOR PERFORMING A BEAMFORMING
PROCEDURE FOR A DISTRIBUTED TRANSMISSION

904

RECEIVING AN INTENT TO PARTICIPATE FROM AT LEAST ONE OF
THE PLURALITY OF ACCESS POINTS BASED ON THE GROUP
FORMATION TRIGGER

906

FORMING THE GROUP BASED ON RECEIVING THE INTENT TO
PARTICIPATE FROM THE AT LEAST ONE OF THE PLURALITY OF
ACCESS POINTS

FIG. 9

DISTRIBUTED MULTI-USER (MU) WIRELESS COMMUNICATION

CROSS-REFERENCE TO RELATED APPLICATIONS

This Patent Application is a continuation of U.S. non-provisional application Ser. No. 17/127,890, filed on Dec. 18, 2020, entitled "DISTRIBUTED MULTI-USER (MU) WIRELESS COMMUNICATION", now U.S. Pat. No. 11,728,848, which is a continuation of U.S. patent application Ser. No. 15/872,294, filed Jan. 16, 2018, now U.S. Pat. No. 10,897,285, which claims benefit of and priority to U.S. Provisional Patent Application Ser. No. 62/459,290, filed Feb. 15, 2017. Each of these applications is herein incorporated by reference in its entirety as if fully set forth below and for all applicable purposes.

TECHNICAL FIELD

This disclosure relates generally to wireless communications and, more particularly to systems and methods for group formation and sounding for distributed multi-user multiple input multiple output (MU-MIMO).

DESCRIPTION OF THE RELATED TECHNOLOGY

To address the issue of increasing bandwidth requirements that are demanded for wireless communication systems, different schemes are being developed to allow multiple user terminals to communicate with a single access point (AP) or multiple APs by sharing the channel resources while achieving high data throughputs. Multiple Input Multiple Output (MIMO) technology represents one such approach that has recently emerged as a popular technique for the next generation communication systems.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (such as higher throughput and greater reliability) if the additional dimensionalities created by the multiple transmit and receive antennas are utilized.

In wireless networks with multiple APs and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

In a distributed MU-MIMO system, multiple APs may simultaneously serve a plurality of spatially separated STAs by coordinating beamforming by the antennas of the multiple APs. For example, multiple APs may coordinate transmissions to each STA.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. The method includes transmitting, from a first access point of a plurality of access points, an announcement frame for performing a beamforming procedure for a distributed transmission. The distributed transmission includes a transmission from the plurality of access points. The announcement frame includes at least one identifier of a user terminal in a different basic service set than a basic service set of the first access point. The method further includes transmitting, from the first access point, a packet for measuring a channel. The method further includes receiving, by the first access point, feedback information from the user terminal based on the packet for measuring the channel. The method further includes transmitting, by the first access point, the distributed transmission using the beamforming procedure. The beamforming procedure is based on the feedback information.

Another innovative aspect of the subject matter described in this disclosure can be implemented in a first access point of a plurality of access points. The first access point includes a memory and a processor coupled to the memory. The processor is configured to transmit an announcement frame for performing a beamforming procedure for a distributed transmission. The distributed transmission includes a transmission from the plurality of access points. The announcement frame includes at least one identifier of a user terminal in a different basic service set than a basic service set of the first access point. The processor is further configured to transmit a packet for measuring a channel. The processor is further configured to receive feedback information from the user terminal based on the packet for measuring the channel. The processor is further configured to transmit the distributed transmission using the beamforming procedure. The beamforming procedure is based on the feedback information.

Another innovative aspect of the subject matter described in this disclosure can be implemented in a first access point of a plurality of access points. The first access point includes means for transmitting an announcement frame for performing a beamforming procedure for a distributed transmission. The distributed transmission includes a transmission from the plurality of access points. The announcement frame includes at least one identifier of a user terminal in a different basic service set than a basic service set of the first access point. The first access point further includes means for transmitting a packet for measuring a channel. The first access point further includes means for receiving feedback information from the user terminal based on the packet for measuring the channel. The first access point further includes means for transmitting the distributed transmission using the beamforming procedure, wherein the beamforming procedure is based on the feedback information.

Another innovative aspect of the subject matter described in this disclosure can be implemented in a non-transitory computer-readable medium that when executed by at least one processor causes the at least one processor to perform a method of wireless communication. The method includes transmitting, from a first access point of a plurality of access points, an announcement frame for performing a beamforming procedure for a distributed transmission. The distributed transmission includes a transmission from the plurality of access points. The announcement frame includes at least one identifier of a user terminal in a different basic service set than a basic service set of the first access point. The method further includes transmitting, from the first access point, a packet for measuring a channel. The method further includes receiving, by the first access point, feedback information from the user terminal based on the packet for measuring the channel. The method further includes transmitting, by the first access point, the distributed transmission using the beamforming procedure. The beamforming procedure is based on the feedback information.

In some implementations, the method or first access point can include transmitting, from the first access point, a group formation trigger for forming a group including the plurality of access points for performing the beamforming procedure for the distributed transmission. The method or first access point can further include receiving an intent to participate from at least one of the plurality of access points based on the group formation trigger. The method or first access point can further include forming the group based on receiving the intent to participate from the at least one of the plurality of access points.

In some implementations, the group formation trigger includes an indication of a number of spatial streams available for transmissions of other access points.

In some implementations, the method or first access point can include transmitting by the first access point a request frame requesting the feedback information, wherein the request frame includes the at least one identifier of the user terminal in the different basic service set than the basic service set of the first access point.

In some implementations, the announcement frame includes an allocation of a plurality of spatial streams to the plurality of access points.

In some implementations, each of the plurality of access points transmits a separate packet for measuring a channel during a first time interval based on the announcement frame, and the plurality of access points multiplex transmitting the separate packets using one or more of frequency division multiplexing, code division multiplexing, a P-matrix, or time division multiplexing.

In some implementations, each of the plurality of access points transmits a separate packet for measuring a channel during different time intervals based on the announcement frame.

In some implementations, each of the plurality of access points transmits a separate announcement frame based on the announcement frame transmitted by the first access point.

In some implementations, each of the plurality of access points transmits a separate packet for measuring a channel during a first time interval based on the announcement frame.

In some implementations, the method or first access point can include transmitting by the first access point a request frame requesting the feedback information, wherein the request frame includes the at least one identifier of the user terminal in the different basic service set than the basic service set of the first access point.

Another innovative aspect of the subject matter described in this disclosure can be implemented in a method of wireless communication. The method includes transmitting, from a first access point, a group formation trigger for forming a group including a plurality of access points for performing a beamforming procedure for a distributed transmission. The method further includes receiving an intent to participate from at least one of the plurality of access points based on the group formation trigger. The method further includes forming the group based on receiving the intent to participate from the at least one of the plurality of access points.

Another innovative aspect of the subject matter described in this disclosure can be implemented in a first access point. The first access point includes a memory and a processor coupled to the memory. The processor is configured to transmit a group formation trigger for forming a group including a plurality of access points for performing a beamforming procedure for a distributed transmission. The processor is further configured to receive an intent to participate from at least one of the plurality of access points based on the group formation trigger. The processor is further configured to form the group based on receiving the intent to participate from the at least one of the plurality of access points.

Another innovative aspect of the subject matter described in this disclosure can be implemented in a first access point. The first access point includes means for transmitting a group formation trigger for forming a group including a plurality of access points for performing a beamforming procedure for a distributed transmission. The first access point further includes means for receiving an intent to participate from at least one of the plurality of access points based on the group formation trigger. The first access point further includes means for forming the group based on receiving the intent to participate from the at least one of the plurality of access points.

Another innovative aspect of the subject matter described in this disclosure can be implemented in a non-transitory computer-readable medium that when executed by at least one processor causes the at least one processor to perform a method of wireless communication. The method includes transmitting, from a first access point, a group formation trigger for forming a group including a plurality of access points for performing a beamforming procedure for a distributed transmission. The method further includes receiving an intent to participate from at least one of the plurality of access points based on the group formation trigger. The method further includes forming the group based on receiving the intent to participate from the at least one of the plurality of access points.

In some implementations, the method or first access point can include wherein the group formation trigger includes an indication of a number of spatial streams available for transmissions of other access points.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 8 illustrates example operations for performing a sounding procedure for distributed MU-MIMO.

FIG. 9 illustrates example operations for performing an over the air group formation procedure for distributed MU-MIMO.

Like reference numbers and designations in the various drawings indicate like elements.

DETAILED DESCRIPTION

Figure 1:
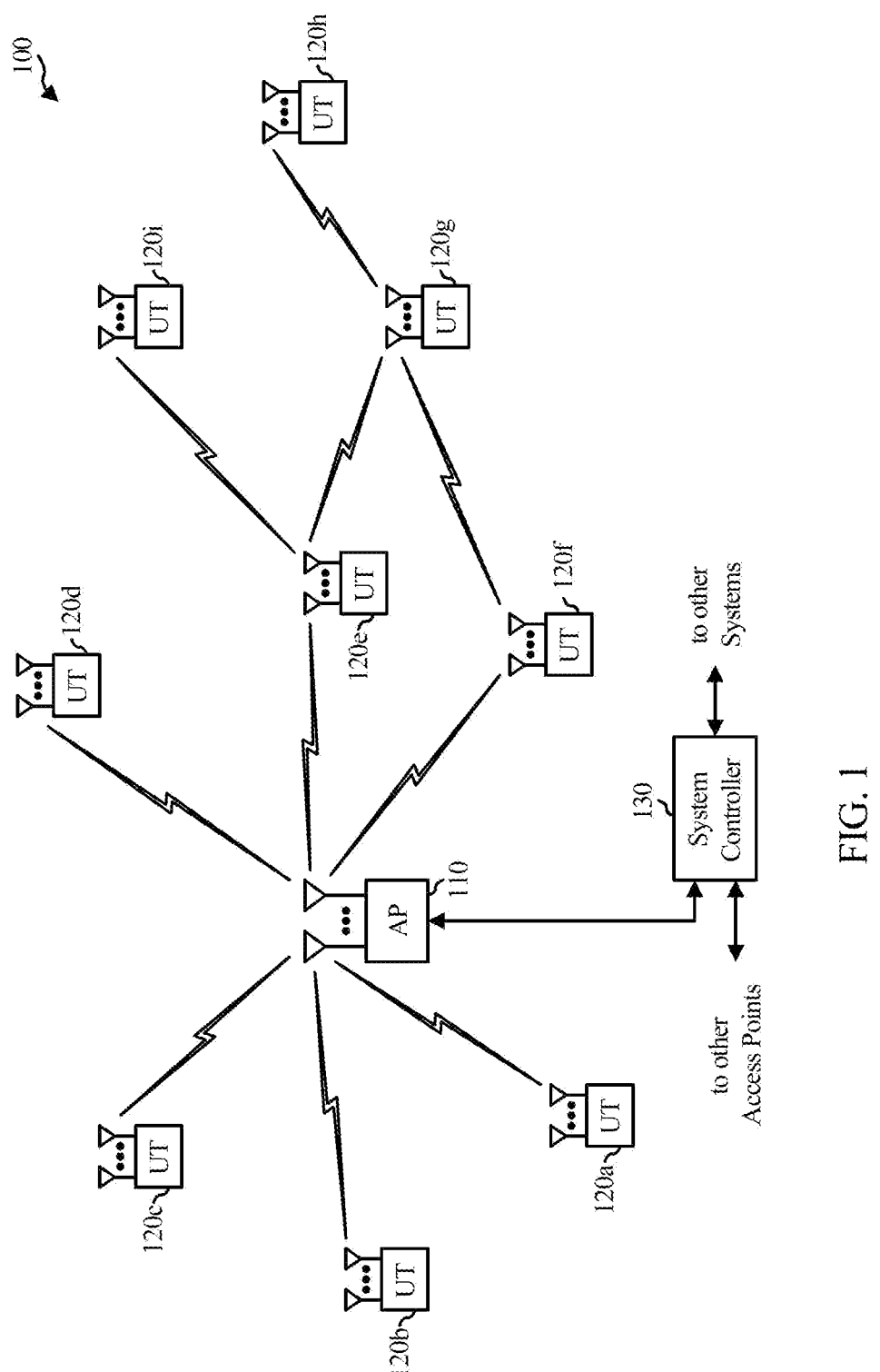
FIG. 1 illustrates an example wireless communications network.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, new radio (NR), or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a user terminal.

Multiple APs may transmit to multiple receiving user terminals at a time by using distributed multi-user multiple input multiple output (MU-MIMO). For example, multiple APs may transmit data to a given user terminal at a time, meaning the transmission of data to the user terminal is distributed between the multiple APs. The multiple APs may utilize beamforming to steer signals spatially to the user terminal. In some implementations, for the multiple APs to perform distributed MU-MIMO, the multiple APs coordinate the beamforming performed by each AP to reduce interference for transmitting data to the user terminal. In some implementations, the multiple APs perform a procedure to form a group of APs to transmit to the user terminal, as discussed herein. Further, in some implementations, to coordinate the beamforming between the multiple APs, the multiple APs perform a sounding procedure to gather feedback information from the user terminal about wireless channels between the multiple APs and the user terminal, as discussed herein. The multiple APs may utilize the feedback information to perform beamforming.

Particular implementations of the subject matter described in this disclosure can be implemented to realize one or more of the following potential advantages. For example, APs can form a group for transmitting to a user terminal using over the air signaling as opposed to communicating over a backhaul. This may reduce data congestion on the backhaul. Additionally, the sounding procedures may allow for coordinated gathering of feedback information by multiple APs from user terminals. Accordingly, the feedback information for the multiple APs may include channel conditions for each of the multiple APs coordinated in time, which may improve the accuracy of the beamforming based on the feedback information. Furthermore, the sounding procedures may limit the amount of data exchanged wirelessly to perform the sounding procedures, which may reduce bandwidth usage of wireless channels.

FIG. 1 illustrates a multiple-access Multiple Input Multiple Output (MIMO) system 100 with access points and user terminals. For simplicity, only one access point 110 is shown in FIG. 1. An access point (AP) is generally a fixed station that communicates with the user terminals and may be referred to as a base station or some other terminology. A user terminal may be fixed or mobile and may be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal also may communicate peer-to-peer with another user terminal. A system controller 130 couples to and provides coordination and control for the access points.

The MIMO system 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 also may utilize a single carrier (such as a carrier frequency) or multiple carriers for transmission. Each user terminal may be equipped with a single antenna (such as to keep costs down) or multiple antennas (such as where the additional cost can be supported). The MIMO system 100 may represent a high-speed Wireless Local Area Network (WLAN) operating in a 60 GHz band.

Figure 2:
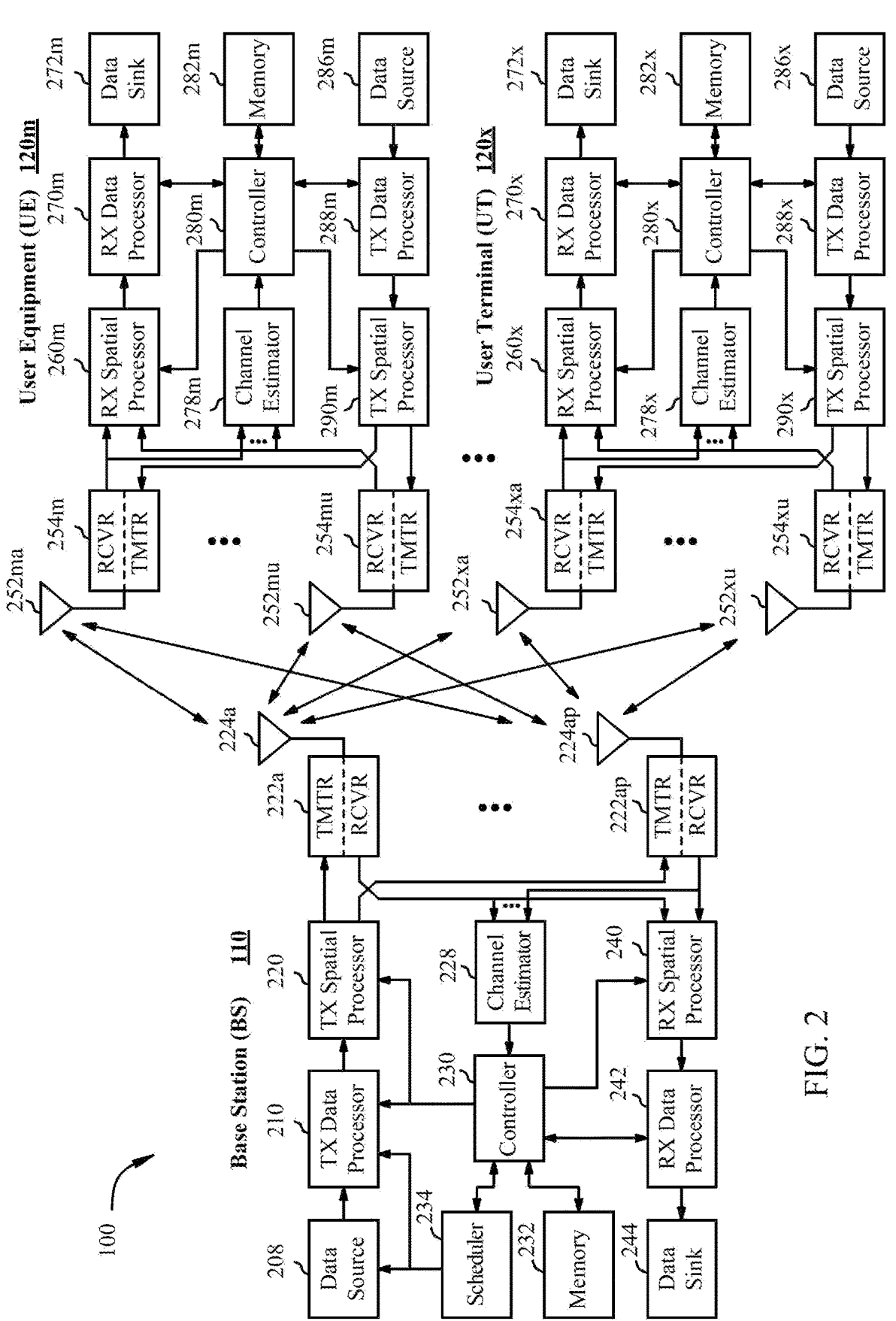
FIG. 2 illustrates a block diagram of an example access point and user terminals.

FIG. 2 shows a block diagram of the access point/base station 110 and two user terminals/user equipment 120m and 120x in the MIMO system 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$, and $N_{dn}$ may include static values or can change for each scheduling interval. Beamforming (such as beam-steering) or some other spatial processing techniques may be used at the access point and user terminal.

On the uplink, at each user terminal 120 selected for uplink transmission, a TX data processor 288 receives traffic data from a data source 286 and control data from a controller 280. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{s_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
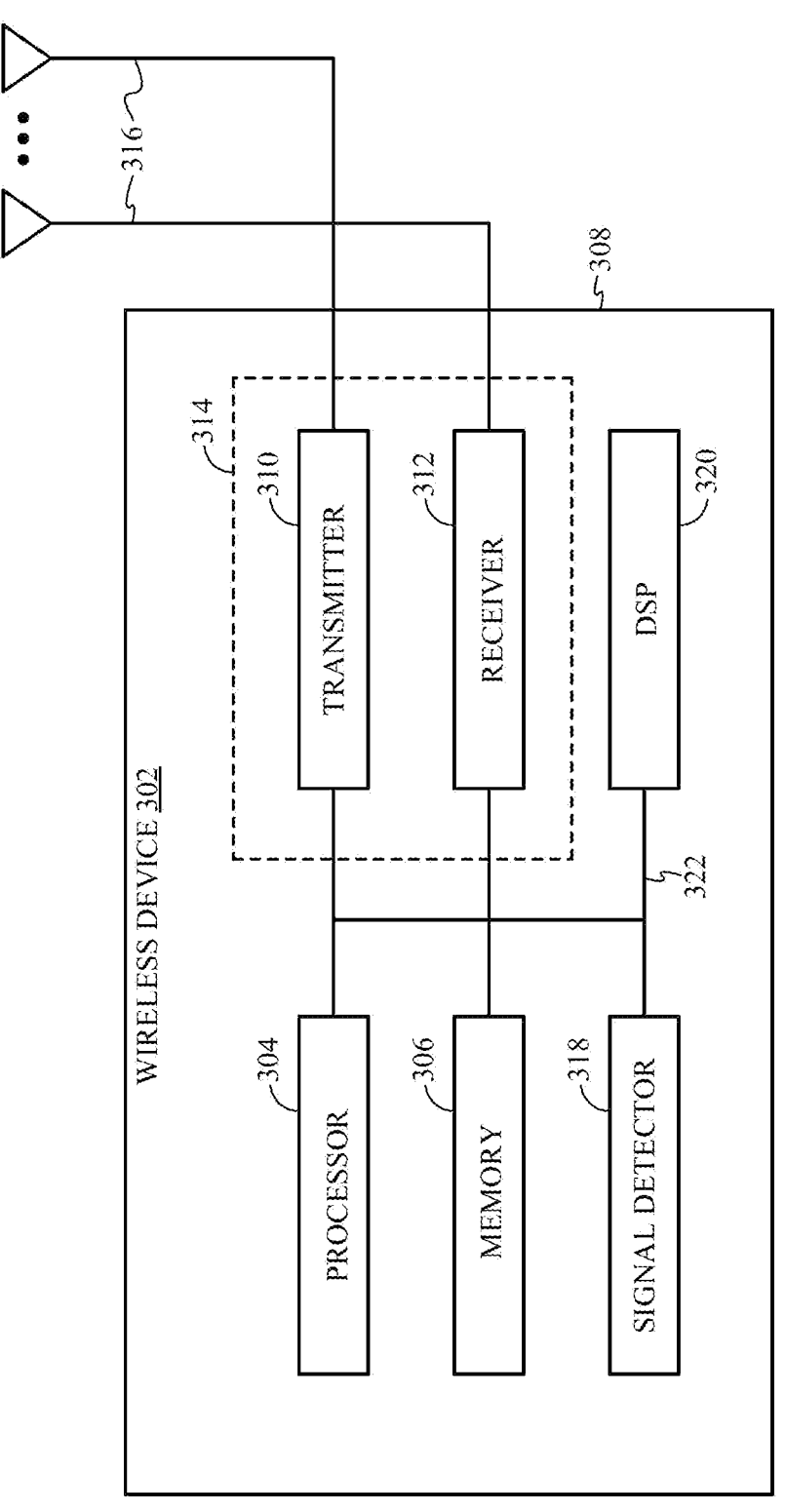
FIG. 3 illustrates a block diagram of an example wireless device.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304, which controls operation of the wireless device 302. The processor 304 also may be referred to as a central processing unit (CPU). Memory 306, which may include both read-only memory (ROM) and random-access memory (RAM), provides instructions and data to the processor 304. A portion of the memory 306 also may include non-volatile random-access memory (NVRAM). The processor 304 typically performs logical and arithmetic operations based on program instructions stored within the memory 306. The instructions in the memory 306 may be executable to implement the methods or operations described herein, such as those described with respect to FIG. 8 or 9.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

Distributed MU-MIMO

As discussed with respect to FIGS. 1-3, a single AP 110 may transmit to multiple receiving user terminals 120 at a time by using multi-user MIMO (MU-MIMO). The AP 110 includes multiple antennas 224. Using the multiple antennas 224, the AP 110 can utilize beamforming to focus the energy of a transmitted signal spatially (such as to a user terminal 120 as a spatial stream). To perform beamforming, the AP 110 may exchange frames with the user terminal 120 to measure a channel between the AP 110 and the user terminal 120. For example, the AP 110 may transmit a null data packet (NDP) including one or more long training fields (LTFs) that the user terminal 120 uses to measure the channel. The user terminal 120 may generate a channel feedback information (such as a feedback matrix) based on the channel measurements, and send the feedback matrix to the AP 110. Using the feedback matrix, the AP 110 may derive a steering matrix, which the AP 110 uses to determine how to transmit a signal on each antenna 224 of the AP 110 to perform beamforming. For example, the steering matrix may be indicative of a phase shift, power level, etc. to transmit a signal on each of the antennas 224. For example, the AP 110 may be configured to perform similar beamforming techniques as described in the 802.11ac standard.

In some implementations, multiple APs 110 may be configured to transmit to one or more receiving user terminals 120 at a time utilizing distributed MU-MIMO. There may be multiple different types of MU-MIMO transmissions, including coordinated beamforming (COBF) and joint processing transmission (JT).

10

Figure 4:
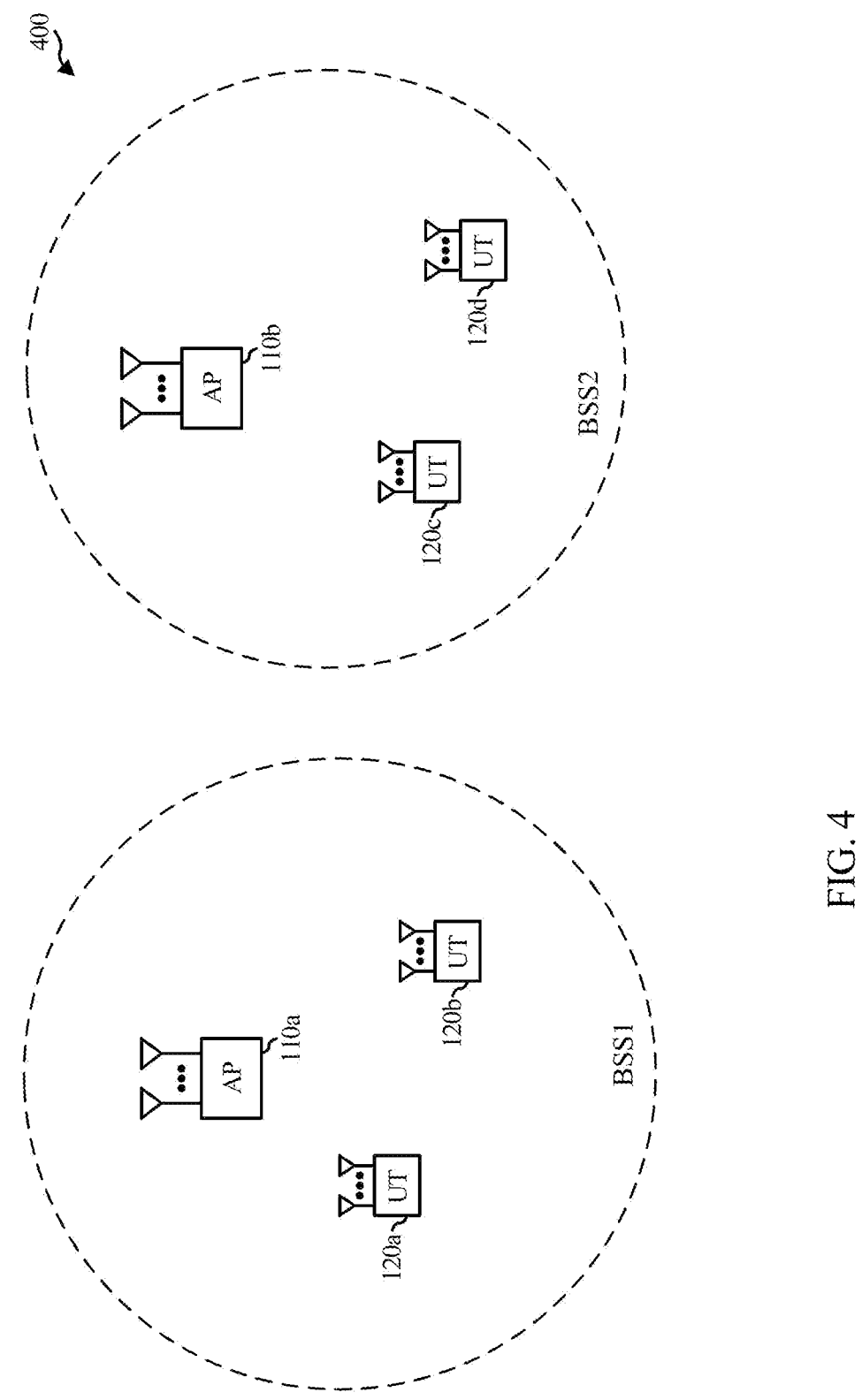
FIG. 4 illustrates an example of a distributed multi-user multiple input multiple output (MU-MIMO) system.

FIG. 4 illustrates a distributed MU-MIMO system 400. As shown, system 400 includes an AP 110*a* and an AP 110*b*. The APs 110*a* and 110*b*, in some implementations, refer to the AP 110 described with respect to FIG. 1. The AP 110*a* is shown as part of a first basic service set (BSS), BSS1, and the AP 110*b* is shown as part of a second BSS, BSS2. The AP 110*a* and the AP 110*b* may be neighboring APs. Further, portions of the coverage area of the AP 110*a* may overlap with portions of the coverage area of BSS2, leading to an overlapping BSS (OBSS) situation. Communications by the AP 110*a* with user terminals in BSS1 may be referred to as in BSS communications. Similarly, communication by the AP 110*b* with user terminals in BSS2 may be referred to as in BSS communications. Further, communications by the AP 110*a* with user terminals in BSS2 may be referred to as OBSS communications, and communications by the AP 110*b* with user terminals in BSS1 may be referred to as OB SS communications.

In COBF, signals (such as data) for a given user terminal may be transmitted by only a single AP. For example, the user terminals 120*a* and 120*b* are shown as part of BSS1 and therefore only the AP 110*a* may transmit signals intended for the user terminals 120*a* and 120*b*. Further, user terminals 120*c* and 120*d* are shown as part of BSS2 and therefore only the AP 110*b* may transmit signal intended for the user terminals 120*c* and 120*d*. The user terminals 120*a* through 120*d*, in some implementations, refer to the user terminal 120 described with respect to FIG. 1. However, as discussed, the coverage area of the AP 110*a* and the AP 110*b* may overlap, and therefore signals transmitted by the AP 110*a* may reach the user terminals 120*c* and 120*d* in BSS2 as OBSS signals. Similarly, signals transmitted by the AP 110*b* may reach the user terminals 120*a* and 120*d* in BSS1 as OBSS signals. In COBF, the APs 110*a* and 110*b* may be configured to perform beamforming to form nulls in the direction of user terminals in OBSS, such that any signals received at an OBSS user terminal are of a low power. For example, the AP 110*a* may be configured to perform beamforming to form nulls toward the user terminals 120*c* and 120*d*, and the AP 110*b* may be configured to form nulls toward the user terminals 120*a* and 120*b* to limit the interference at the user terminals. Accordingly, in COBF, APs are configured to form nulls for OBSS user terminals and configured to beamform signals to in-BSS user terminals.

In JT, signals for a given user terminal may be transmitted by multiple APs. For example, one or more of user terminals 120*a* through 120*d* may receive signals from both the AP 110*a* and the AP 110*b*. For the multiple APs to transmit data to a user terminal, the multiple APs may all need a copy of the data to be transmitted to the user terminal. Accordingly, the APs may need to exchange the data (such as through a backhaul) between each other for transmission to a user terminal. For example, the AP 110*a* may have data to transmit to user terminal 120*a*, and may further communicate that data over a backhaul to the AP 110*b*. The AP 110*a* and the AP 110*b* may then beamform signals including the data to the user terminal 120*a*.

In some implementations, in JT, the antennas of the multiple APs transmitting to one or more user terminals may be considered as one large antenna array (such as virtual antenna array) used for beamforming and transmitting signals. Accordingly, similar beamforming techniques as discussed and used for transmitting from multiple antennas of a single AP to one or more user terminals, may instead be used for transmitting from multiple antennas of multiple APs. For example, the same beamforming, calculating of steering matrices, etc. for transmitting from multiple antennas of the AP 110*a*, may be applied to transmitting from the multiple antennas of both the AP 110*a* and the AP 110*b*. The multiple antennas of the multiple APs may be able to form signals on a plurality of spatial streams (such as limited by the number of antennas). Accordingly, each user terminal may receive signals on one or more of the plurality of spatial streams. In some implementations, each AP may be allocated a certain number of the plurality of spatial streams for transmission to user terminals in the BSS of the AP. Each spatial stream may be identified by a spatial stream index.

In some implementations, various factors may affect distributed MU-MIMO. For example, one factor may be channel feedback accuracy. As discussed, to perform beamforming APs may exchange signals with user terminals over a communication channel, and the user terminals may make measurements of the channel based on the exchanged signals. The user terminals may further send information regarding the channel measurements to the APs as channel feedback information. The APs may utilize the channel feedback information to perform beamforming. However, the channel conditions may change between when the APs receive the channel feedback information and when the APs transmit signals on the channel. This may be referred to as channel aging. Further, there may be inaccuracy due to quantization of the information included in the channel feedback information. This may impact both COBF and JT distributed MU-MIMO and lead to leakage and interference.

Another factor may be phase offsets between APs. For example, APs may transmit with different phases due to timing synchronization differences between the APs. Further, the difference in phases may drift or change (such as due to phase noise, timing drift, carrier frequency offset (CFO) drift, etc.) between when the channel feedback information is received and when the APs transmit to the user terminals. This change in phase difference may not affect COBF significantly as each AP performs beamforming independently. However, this change in phase difference may affect JT as the APs perform beamforming together.

Another factor may be timing offset. For example, the delay spread, filter delay, and arrival time spread of APs using JT and COBF may need to be absorbed with a cyclic prefix (CP). For JT, additionally, the relative timing offset (i.e., the change in timing offset between when the channel feedback information is measured and when the signals are transmitted) also may affect phase offsets and may need to be further controlled.

Another factor may be CFO. In COBF, the synchronization requirements for CFO may be reduced as compared to JT.

Another factor may be gain mismatch, where different APs use different gain states while measuring channels of user terminals. This may have a larger effect on JT than COBF. In some implementations of COBF, the largest gain may be approximately 75% of the minimum of number of transmit antennas of any of the APs. In some implementations of JT, the largest gain may be approximately 75% of the sum of the transmit antennas of all the APs.

In some implementations, in MU-MIMO for a single AP transmitting to multiple user terminals, to perform channel measurements for beamforming, all the transmit antennas of the AP are sounded together, meaning that all the transmit antennas transmit NDP during the same transmission time interval (such as TTI, frame, subframe, etc.). All antennas may be sounded together, because if NDPs for each antenna were transmitted at different TTIs, they may be transmitted with different phases and the receiver automatic gain control (RxAGC) (which may affect the gain applied to the received signal) at each user terminal receiving the NDPs may be different for different TTIs, which may make it difficult to stitch together measurements from the different NDPs. Further, the relative timing (such as with respect to the start of a TTI) among all transmit antennas for transmitting NDP at the same TTI is constant for all the transmit antennas, and remains the same for when the NDP is transmitted and for when data is later transmitted to the user terminals based on channel feedback information. Therefore, there is no change in relative timing between NDP transmission and data transmission, thereby ensuring better beamforming.

In some implementations, all antennas for multiple APs may be sounded together to transmit NDP together at the same TTI for JT in a joint sounding procedure, to avoid issues discussed. In some implementations, the NDPs of different APs may be sounded at the same TTI using one or more techniques such as time-division multiplexing (TDM), code-division multiplexing (CDM) (such as using a P-matrix), and frequency-division multiplexing (FDM).

For COBF, the beamforming direction of one AP does not depend on the channels between user terminals and other APs. Accordingly, only loose synchronization may be needed between APs. Therefore, for COBF, in addition to being able to use a joint sounding procedure, a sequential sounding procedure can be used where APs sound one at a time in separate TTIs and transmit NDPs at different TTIs per AP.

Figure 5:
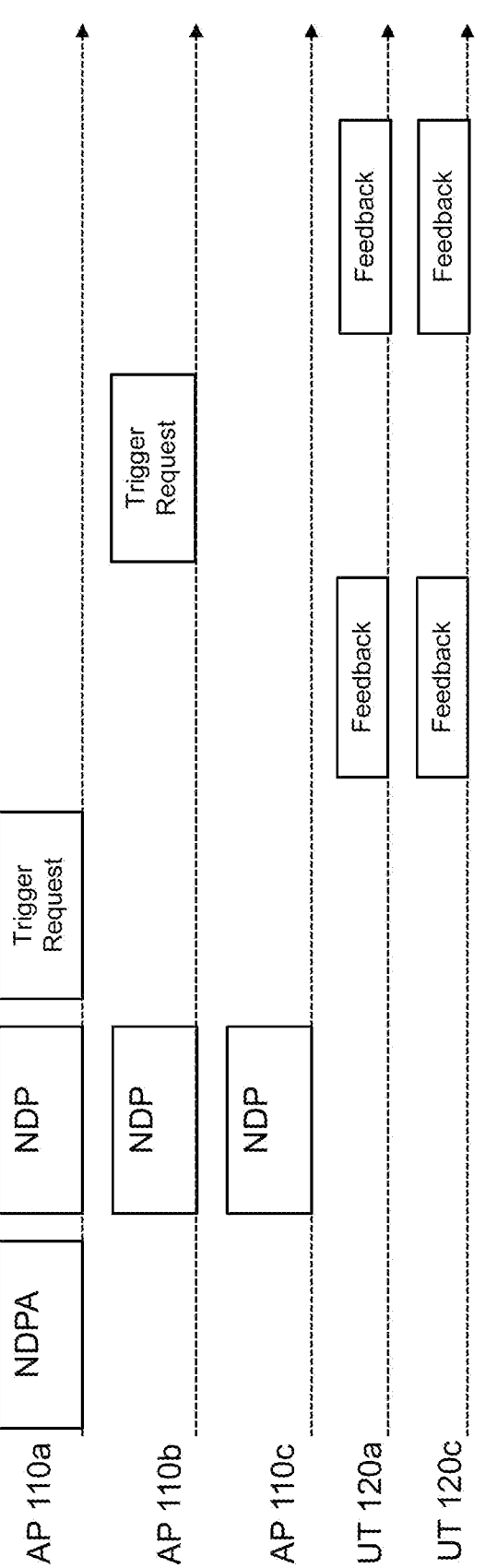
FIG. 5 illustrates a signal diagram of an example joint sounding procedure for distributed MU-MIMO.

FIG. 5 illustrates a signal diagram of an example joint sounding procedure for distributed MU-MIMO. As shown, three APs, the AP 110*a*, the AP 110*b*, and the AP 110*c* may be coordinating to perform distributed MU-MIMO transmission to two user terminals, the user terminal 120*a* and the user terminal 120*c*. The APs 110*a* through 110*c*, and user terminals 120*a* and 120*c*, in some implementations, refer to the AP 110 and the user terminal 120 described with respect to FIG. 1. However, it should be noted that distributed MU-MIMO transmission may be made from any number of APs to any number of one or more user terminals. In the signal diagram, time is shown as increasing along the x-axis. Initially, any one of the APs (here shown as the AP 110*a*) transmits a NDP announcement (NDPA) frame. The NDPA may be a control frame that indicates an NDP is going to be transmitted. In some implementations, the NDPA includes information identifying one or more user terminals 120 that the upcoming NDP is directed to, so the one or more user terminals receiving the NDPA know to listen for the NDP to perform channel measurements. Accordingly, in the present example, the NDPA may include identifiers of the user terminal 120*a* and the user terminal 120*c*. Since the NDPA sent from the AP 110*a* may identify the user terminals 120 associated with other APs, the NDPA may therefore identify user terminals in BSS of the AP 110*a* and OBSS of the AP 110*a*.

In some implementations, the NDPA may include allocation information of spatial streams to the APs 110. For example, the allocation information may include a mapping or correlation of spatial stream indices to the APs 110. An allocation of a spatial stream to a particular AP 110 may indicate that the spatial stream is to be used for transmission in the BSS of the particular AP 110.

In some implementations, the NDPA may include the allocation information of spatial streams to the user terminals 120. For example, the allocation information may include a mapping or correlation of spatial stream indices to the user terminals 120. An allocation of a spatial stream to a user terminal 120 may indicate that the spatial stream is to be used for transmission to the user terminal 120.

In some implementations, the NDPA may include an identification (such as BSS ID, MAC address, etc.) of APs 110 (in this example APs 110a through 110c) that are to participate in the joint sounding procedure.

After the AP 110a transmits the NDPA, each of the APs 110a through 110c transmits an NDP at the same time (such as during the same TTI). In some implementations, the APs 110a through 110c synchronize transmission of the NDP based on the NDPA. For example, each AP 110a through 110c may be configured to transmit the NDP after a fixed time interval (such as short interframe space (SIFS)) after receiving the NDPA. In some implementations, the APs 110a through 110c synchronize transmission of the NDP via a backhaul. The user terminals 120a and 120c may receive the NDPs.

In some implementations, the NDPs are multiplexed to avoid interference with each other. In particular, the LTFs of the NDPs from multiple APs may be multiplexed. In some implementations, the LTFs are multiplexed across APs using FDM. Further, in some implementations, every spatial stream belonging to the APs is multiplexed using FDM. For example, if there are N+M+X spatial streams, N belonging to the AP 110a, and M belonging to the AP 110b, and X belonging to the AP 110c, each N+M+X stream is transmitted on a different tone of each symbol where LTF is transmitted. Further, LTF is transmitted on N+M+X symbols. Therefore, each stream is transmitted on each tone. Therefore, each stream of each AP can be estimated on each tone.

In some implementations, NDP are multiplexed using FDM and a P-matrix. In some implementations, a P-matrix is an orthogonal code, with one dimension being spatial streams and the other being LTF symbols. Accordingly, in some implementations, the spatial streams of an individual AP 110 are multiplexed using the P-matrix, but different APs 110 transmit on non-overlapping tones for each LTF symbol. Further, LTF is transmitted on enough symbols for each AP to transmit on each tone.

In some implementations, NDP are multiplexed using only a P-matrix. In particular, the P-matrix may have a size to accommodate all spatial streams of all the APs 110.

In some implementations, NDP are multiplexed using TDM only, where each spatial stream is allocated to one LTF symbol and transmitted on all the tones of the LTF symbol.

In some implementations, NDP are multiplexed using TDM and a P-matrix. Accordingly, in some implementations, the spatial streams of an individual AP 110 are multiplexed using the P-matrix, but different APs 110 transmit on different LTF symbols (such as all the tones of the LTF symbol).

Further, after the APs 110a through 110c transmit the NDP, one of the APs (such as the AP 110a) transmits a trigger request for feedback (such as channel feedback information) from each of the user terminals 120a and 120c the NDP was transmitted to. For example, the trigger request may be transmitted after a fixed period (such as SIFS) after the NDP is transmitted. The trigger request from the AP 110a may therefore include identifiers of the user terminals 120a and 120c. Since the trigger request sent from the AP 110a may identify the user terminals 120 associated with other APs, the trigger request may therefore identify user terminals in BSS of the AP 110a and OBSS of the AP 110a.

The user terminal 120a and 120c identified in the trigger request may send channel feedback information to the AP 110a based on the trigger request. As shown, the user terminals 120 may transmit the channel feedback information in parallel (such as using uplink Orthogonal Frequency-Division Multiple Access (UL-OFDMA), UL MU-MIMO, etc.). However, in some implementations, the user terminals may transmit the feedback information serially (such as sequentially). In some implementations, instead of the AP 110a sending a single trigger request for multiple user terminals, the AP 110a may send multiple trigger requests (such as sequentially), one for each user terminal.

Further, the remaining APs 110b and 110c may transmit trigger requests and receive feedback from the user terminals 120a and 120c as discussed. As shown the APs 110 transmit trigger requests and receive feedback information separately. However, in some implementations, the APs 110 may transmit trigger requests and receive feedback information in parallel (such as using OFDMA, MIMO, etc.).

Based on the received channel feedback information, the APs 110a-110c may perform beamforming (such as by deriving steering matrices) and transmit data to the user terminals 120a and 120c. In some implementations, the APs 110a-110c may transmit data after the sounding phase at a particular TTI, or in some implementations the AP 110a may send a trigger frame to indicate the TTI and coordinate the data transmission. As discussed, NDP from multiple APs 110 may be synchronized through the backhaul or pre-corrected based on the received NDPA. Accordingly, in some implementations, for the distributed MU-MIMO data transmission to the user terminals 120a and 120c, the APs 110 may utilize the same frequency and time synchronization as used for the NDP to ensure proper beamforming. In some implementations, the transmit power backoff used by the APs may be kept constant between NDP and data transmission of the APs to ensure proper beamforming (such as prevent phase rotations).

In some implementations, the NDP transmitted from each AP 110a through 110c may carry a preamble which is the same for all the APs 110a through 110c. Such a preamble may be used by legacy devices that do not support distributed MU-MIMO to defer transmissions.

In some implementations, different APs 110 may have different local oscillators. Therefore, there may be phase drift between the APs 110 as they transmit NDP. Accordingly, for the user terminals 120 to determine when to listen for NDP, they may need to keep track of the phase drift of each AP 110. In some implementations, if transmissions from APs are multiplexed using FDM, phase tracking of the different APs may be performed by tracking the pilots for the different APs, which are transmitted on different tones. In some implementations, if transmission from APs are multiplexed using TDM, the symbol transmissions for different APs may be interleaved instead of the symbols for one AP being transmitted consecutively for better phase tracking (such as phase drift may change at different times so tracking drift over a longer period for each AP may be beneficial).

In some implementations, if transmission from APs are multiplexed using a P-matrix, non-overlapping tones may be assigned for transmission of different APs for phase tracking. Alternatively, multi-stream pilots may be used, where one stream per AP is transmitted on pilot tones to track the phase of each AP, or where the number of streams per AP transmitted on pilot tones is equal to the number of streams given to that AP for transmitting LTF.

Figure 6:
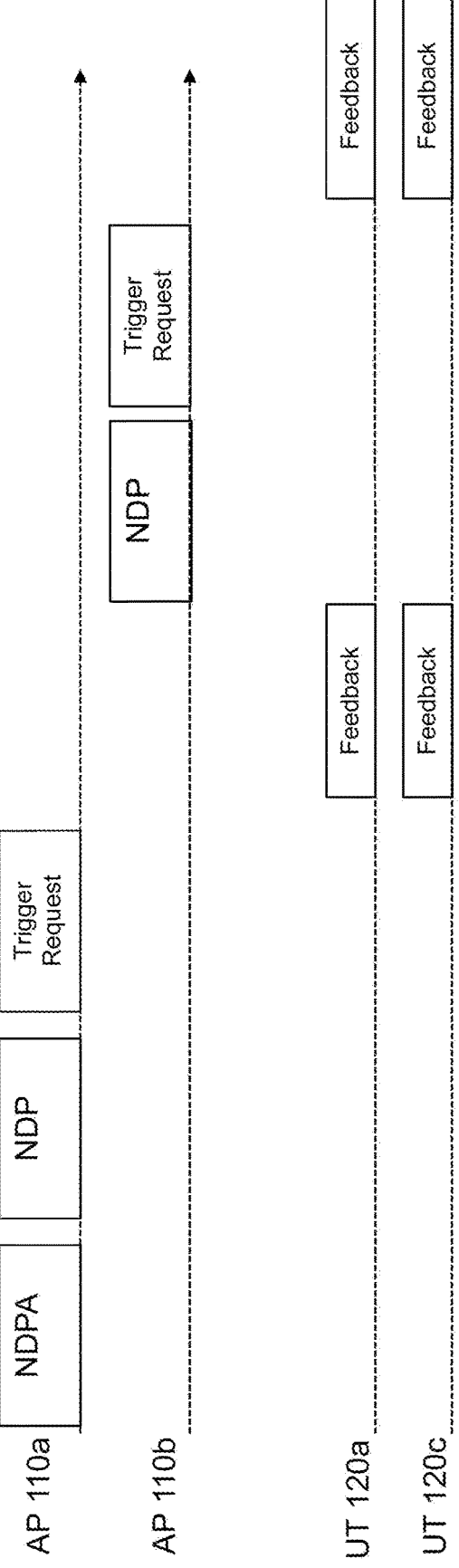
FIG. 6 illustrates a signal diagram of an example sequential sounding procedure for distributed MU-MIMO.
Figure 6:
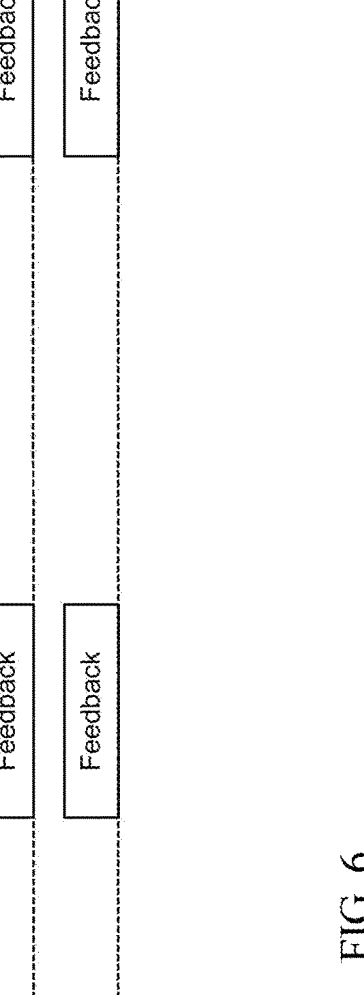

FIG. 6 illustrates a signal diagram of an example sequential sounding procedure for distributed MU-MIMO. In some implementations, initially, any one of the APs (here shown as AP 110a) transmits a NDPA as described with respect to FIG. 5. The AP 110a then alone transmits a NDP to the user terminals 120a and 120c. Continuing the AP 110a transmits one or more trigger requests requesting feedback to the user terminals 120a and 120c as discussed. The user terminals 120a and 120c then, serially or in parallel, transmit channel feedback information to the AP 110a. After the user terminals 120a and 120c transmit the channel feedback information to the AP 110a, the AP 110b alone transmits a NDP to the user terminals 120a and 120c, transmits one or more trigger requests requesting feedback, and receives channel feedback information. Accordingly, a single NDPA is transmitted for starting a sounding procedure for multiple APs, but the NDP are transmitted sequentially.

In some implementations, though not shown, for sequential sounding procedure, instead of one AP 110 transmitting one NDPA for transmission of multiple NDPs by multiple APs 110, each AP 110 may sequentially transmit a NDPA and perform the sounding procedure. Accordingly, each AP 110 transmits its own NDPA before transmitting NDP sequentially (such as shown in FIG. 6).

In both such sequential sounding procedures, the NDPA may still identify user terminals associated with other APs than the transmitting AP, and the NDPA may therefore identify user terminals in BSS of the transmitting AP and OBSS of the transmitting AP. Further, the trigger request sent from the transmitting AP may still identify user terminals associated with other APs, and the trigger request may therefore identify user terminals in BSS of the transmitting AP and OBSS of the transmitting AP.

In some implementations, the transmit power backoff used by the APs may be kept constant between NDP and data transmission of the APs to ensure proper beamforming (such as prevent phase rotations). Further, in some implementations, for sequential sounding procedure, the RxAGC at the user terminals may be kept constant between when one AP sounds and another AP sounds to prevent gain offsets. In some implementations, the NDPA may (such as implicitly) indicate to the user terminals to keep RxAGC constant.

As discussed, in distributed MU-MIMO, a plurality of APs 110 may coordinate beamforming. To do so, in some implementations, a group of APs 110 is formed to perform distributed MU-MIMO. In some implementations, the group of APs 110 may be formed through exchanging information over a backhaul. In some implementations the group of APs 110 may be formed through exchanging information over the air. For example, one AP 110 may invite other APs 110 to join a distributed MU-MIMO transmission and exchange frames with the other APs 110 to form a group.

Figure 7:
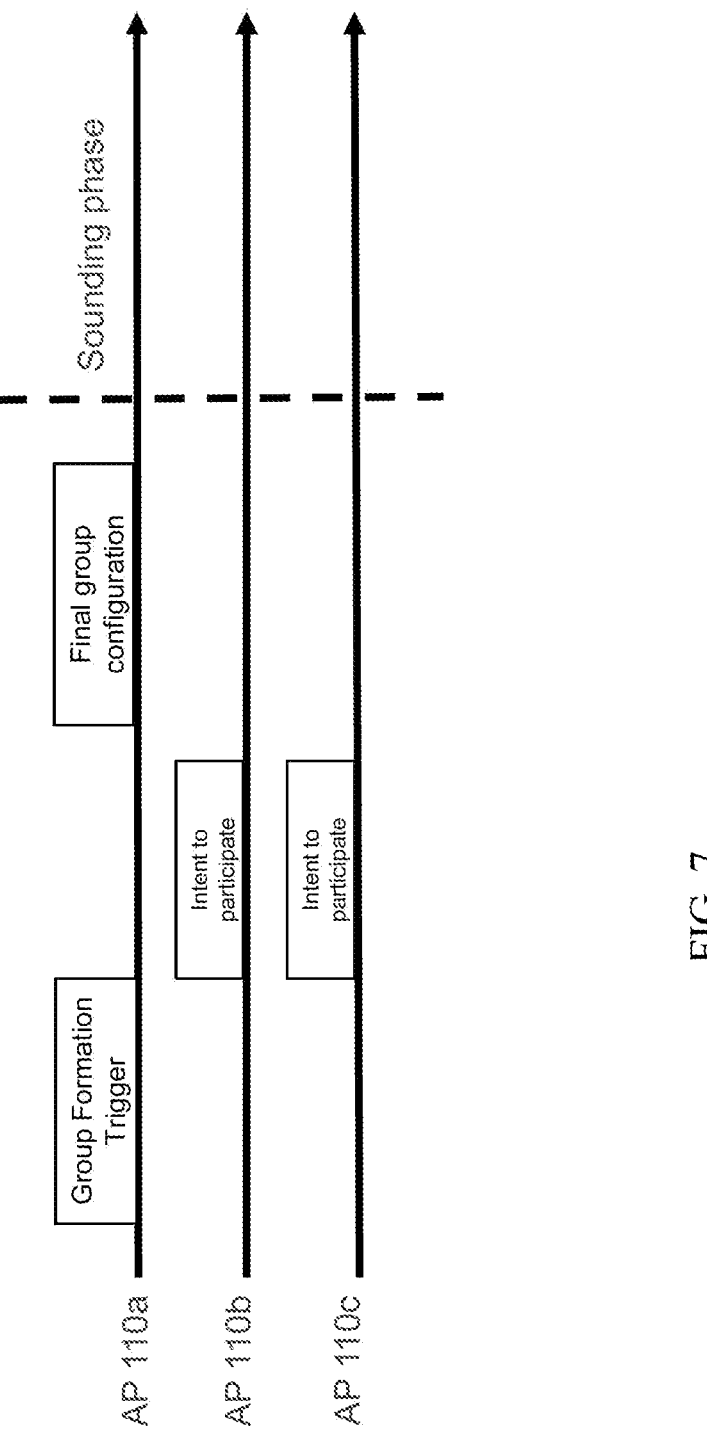
FIG. 7 illustrates a signal diagram of an example over the air group formation procedure for distributed MU-MIMO.

FIG. 7 illustrates a signal diagram of an example over the air group formation procedure for distributed MU-MIMO.

Initially, an AP 110 (in this example the AP 110a) transmits a group formation trigger. For example, if the AP 110a is scheduled to make a DL transmission and is not using all available spatial streams at the AP 110a to make the transmission, the AP 110a may transmit a group formation trigger so other APs 110 can use the remaining spatial streams. The group formation trigger may include the number of streams the AP 110a has available for additional transmissions.

Neighboring APs (in this example the APs 110b and 110c) to the AP 110a may receive the group formation trigger, and determine whether they will join the AP 110a in a distributed MU-MIMO transmission. For example, any neighboring APs with data to transmit may determine to join the group with the AP 110a. For the neighboring APs 110b and 110c that determine to join the group, each transmits an intent to participate to the AP 110a. The intent to participate may include, for example, a list of user terminals 120 that that the given AP 110 wants data transmitted to in the distributed MU-MIMO transmission. Further, the intent to participate may include, for example, a number of spatial streams desired for transmission per user terminal. In some implementations, the APs 110 transmit the intent to participate in parallel using open loop MU-MIMO (similar to uplink MU-MIMO) or using UL-OFDMA.

The AP 110a may receive the intent to participate, determine the group, and perform the sounding phase and distributed MU-MIMO transmission, such as utilizing the techniques described herein. In some implementations, if the AP 110 receives intents to participate requesting more spatial streams than the AP 110a has available, the AP 110a may choose which APs to include in the group and which streams to allocate to which APs.

In some implementations, before performing the sounding phase and after the AP 110a receives the intent to participate, the AP 110a may transmit a final group configuration. The final group configuration may include a listing of the APs 110 included in the group. Further, in some implementations, the final group configuration indicates which spatial streams are allocated to which APs 110 (such as by mapping AP identifiers to stream indices). In some implementations, the final group configuration may include a listing of the user terminals 120 (such as identifiers of the user terminals 120) that the group of APs 110 will send distributed transmissions. Further, in some implementations, the final group configuration indicates which spatial streams or number of spatial streams are allocated to which user terminals 120 (such as by mapping user terminal identifiers to stream indices). In some implementations, instead of the final group configuration being sent by the AP 110a, the information is included in a NDPA as discussed in a sounding phase.

FIG. 8 illustrates example operations 800 for performing a sounding procedure for distributed MU-MIMO, according to some implementations of the present disclosure. According to some implementations, operations 800 may be performed by an access point (such as access point 110).

At 802, a first access point of a plurality of access points transmits an announcement frame (such as NDPA) for performing a beamforming procedure for a distributed transmission (such as distributed MU-MIMO). In some implementations, the distributed transmission includes a transmission from the plurality of access points. In some implementations, the announcement frame includes at least one identifier of a user terminal in a different basic service set than a basic service set of the first access point.

At 804, the first access point transmits a packet (such as NDP) for measuring a channel to one or more user terminals. At 806, the first access point receives feedback information from the user terminal (and the other one or more user terminals) based on the packet for measuring the channel.

At 808, the first access point transmits the distributed transmission (such as the plurality of access points transmit the distributed transmission) using the beamforming procedure. The beamforming procedure is based on the feedback information.

FIG. 9 illustrates example operations 900 for performing an over the air group formation procedure for distributed MU-MIMO, according to some implementations of the present disclosure. According to some implementations, operations 900 may be performed by an access point (such as the access point 110).

At 902, the first access point transmits a group formation trigger for forming a group including a plurality of access points for performing a beamforming procedure for a distributed transmission (such as distributed MU-MIMO). At 904, the first access point receives an intent to participate from at least one of the plurality of access points based on the group formation trigger. At 906, the first access point forms the group based on receiving the intent to participate from the at least one of the plurality of access points.

The various operations of methods described above may be performed by any suitable means capable of performing the corresponding functions. The means may include various hardware and software component(s) and module(s), including, but not limited to a circuit, an application specific integrated circuit (ASIC), or processor. Generally, where there are operations illustrated in the Figures, those operations may be performed by any suitable corresponding counterpart means plus function components.

According to some implementations, such means may be implemented by processing systems configured to perform the corresponding functions by implementing various algorithms (such as in hardware or by executing software instructions) described above.

For example, means for determining and means for scheduling may include one or more processors (such as the RX Data Processor 242 and 270, Controller 230 and 280, and TX Data Processor 210, 288) of the APs 110 or the user terminals 120 illustrated in FIG. 2. Additionally, means for transmitting and means for receiving may include one or more of a transmitter/receiver (such as one or more of the transceiver TX/RX 222 and 254) or one or more antenna (such as one or more of the antennas 224 and 252).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, the apparatus comprising:
    at least one transceiver;
    at least one memory storing computer executable code; and
    one or more processors coupled to the at least one memory and configured to, individually or collectively, execute the computer executable code to cause the apparatus to:
        transmit, via the at least one transceiver, one or more group formation trigger frames;
        receive, via the at least one transceiver, from one or more of a plurality of access points and after transmitting the one or more group formation trigger frame, one or more frames that indicate an intent of the one or more access points to participate in a distributed transmission, the distributed transmission being associated with each of the apparatus and the one or more access points;
        transmit, via the at least one transceiver and to the one or more access points, a sounding announcement frame, wherein the sounding announcement frame includes an identification of the one or more access points;
        transmit, via the at least one transceiver, a sounding packet after transmitting the sounding announcement frame;
        receive, via the at least one transceiver and, after transmitting the sounding packet, channel feedback information from one or more user terminals; and
        transmit, via the at least one transceiver, a transmission associated with the distributed transmission via beamforming, wherein the beamforming is based on the channel feedback information.

2. The apparatus of claim 1, wherein the distributed transmission comprises a downlink multiple user multiple input multiple output (DL MU MIMO) transmission.

3. The apparatus of claim 1, wherein at least one of: the one or more group formation trigger frames or the one or more frames that indicate the intent of the one or more access points to participate includes a quantity of spatial streams information.

4. The apparatus of claim 3, wherein the spatial streams information includes an indication of a quantity of spatial streams available for transmissions by the one or more access points.

5. The apparatus of claim 1, wherein the one or more processors are further configured to, individually or collectively, cause the apparatus to transmit, via the at least one transceiver, a group configuration to the one or more access points.

6. The apparatus of claim 1, wherein the one or more processors are further configured to, individually or collectively, cause the apparatus to allocate, via the sounding announcement frame and to at least one of the one or more access points, a spatial stream via which the at least one access point will transmit a packet.

7. The apparatus of claim 1, wherein the one or more processors are configured to, individually or collectively, cause the apparatus to, after transmitting the sounding announcement frame, receive, via the at least one transceiver, a second sounding announcement frame from at least one of the one or more access points.

8. The apparatus of claim 1, wherein:
    the sounding announcement frame includes at least one identifier of a first user terminal, of the one or more user terminals; and
    the first user terminal is associated with a different basic service set (BSS) than a BSS of the apparatus.

9. The apparatus of claim 1, wherein the one or more processors are further configured to, individually or collectively, cause the apparatus to multiplex the transmission associated with the distributed transmission with the transmissions from each of the one or more access points using one or more of frequency division multiplexing, code division multiplexing, a P-matrix, or time division multiplexing.

10. The apparatus of claim 1,
    wherein the apparatus is configured as to operate as one of the plurality of access points.

11. A method of wireless communication by a first access point of a plurality of access points, the method comprising:
    transmitting one or more group formation trigger frames;
    receiving, from one or more of the plurality of access points and after transmitting the one or more group formation trigger frame, one or more frames that indicate an intent of the one or more access points to participate in a distributed transmission, the distributed transmission being associated with each of the first access point and the one or more access points;
    transmitting, to the one or more access points, a sounding announcement frame, wherein the sounding announcement frame includes an identification of the one or more access points;
    transmitting a sounding packet after transmitting the sounding announcement frame;
    receiving, after transmitting the sounding packet, channel feedback information from one or more user terminals; and
    transmitting a transmission associated with the distributed transmission via beamforming, wherein the beamforming is based on the channel feedback information.

12. The method of claim 11, wherein the distributed transmission comprises a downlink multiple user multiple input multiple output (DL MU MIMO) transmission.

13. The method of claim 11, wherein at least one of: the one or more group formation trigger frames or the one or more frames that indicate the intent of the one or more access points to participate includes quantity of spatial streams information.

14. The method of claim 13, wherein the spatial streams information includes an indication of a quantity of spatial streams available for transmissions by the one or more access points.

15. The method of claim 11, further comprising transmitting a group configuration to the one or more access points.

16. The method of claim 11, further comprising allocating via the sounding announcement frame and to at least one of the one or more access points, a spatial stream via which the at least one access point will transmit a packet.

17. The method of claim 11, further comprising, after transmitting the sounding announcement frame, receive, via the at least one transceiver, a second sounding announcement frame from at least one of the one or more access points.

18. The method of claim 11, wherein:

the sounding announcement frame includes at least one identifier of a first user terminal, of the one or more user terminals; and the first user terminal is associated with a different basic service set (BSS) than a BSS of the first access point.

19. The method of claim 11, further comprising multiplexing the transmission associated with the distributed transmission with the transmissions from each of the one or more access points using one or more of frequency division multiplexing, code division multiplexing, a P-matrix, or time division multiplexing.

20. A first access point of a plurality of access points, comprising:

at least one transceiver;

at least one memory storing computer executable code; and one or more processors coupled to the at least one memory and configured to, individually or collectively, execute the computer executable code to cause the first access point to:

transmit, via the at least one transceiver, one or more group formation trigger frames;

receive, via the at least one transceiver, from one or more of the plurality of access points and after transmitting the one or more group formation trigger frame, one or more frames that indicate an intent of the one or more access points to participate in a distributed transmission, the distributed transmission being associated with each of the first access point and the one or more access points;

transmit, via the at least one transceiver, to the one or more access points, a sounding announcement frame, wherein the sounding announcement frame includes an identification of the one or more access points;

transmit, via the at least one transceiver, a sounding packet after transmitting the sounding announcement frame;

receive, via the at least one transceiver, after transmitting the sounding packet, channel feedback information from one or more user terminals; and transmit, via the at least one transceiver, a transmission associated with the distributed transmission via beamforming, wherein the beamforming is based on the channel feedback information.

* * * * *